United States Patent
Yang

(10) Patent No.: US 8,552,588 B2
(45) Date of Patent: Oct. 8, 2013

(54) BATTERY CHARGING COACTION AND OUTPUT SYSTEM WITH CURRENT LIMIT SUPPLY

(76) Inventor: Tai-Her Yang, Dzan-Hwa (TW)

(*) Notice: Subject to any disclaimer, the term of this patent is extended or adjusted under 35 U.S.C. 154(b) by 896 days.

(21) Appl. No.: 12/591,025

(22) Filed: Nov. 5, 2009

(65) Prior Publication Data

US 2011/0101778 A1    May 5, 2011

(51) Int. Cl.
*H02J 7/34* (2006.01)
*H02J 7/04* (2006.01)

(52) U.S. Cl.
USPC ............ 307/54; 307/64; 320/123; 320/134; 324/426

(58) Field of Classification Search
USPC .......................................... 307/64
See application file for complete search history.

(56) References Cited

U.S. PATENT DOCUMENTS

| | | | | |
|---|---|---|---|---|
| 5,966,000 | A * | 10/1999 | Yang | 322/23 |
| 6,831,464 | B2 * | 12/2004 | Yang | 324/426 |
| 2004/0041568 | A1 * | 3/2004 | Yang | 324/426 |

* cited by examiner

*Primary Examiner* — Rexford Barnie
*Assistant Examiner* — Toan Vu
(74) *Attorney, Agent, or Firm* — Bacon & Thomas, PLLC

(57) ABSTRACT

The present invention relates to a power system utilizing an engine generator or public power with AC source, wherein the power system particularly has the characteristics that the maximum output current thereof is limited by electromagnetic effects, and/or constant current or nearly constant current output thereof is set to be lower than the maximum output current, for powering a load, and charging a battery, or jointly powering a load with a battery; when an engine generator set is utilized to be power supply, during operation, the engine operates with the best brake specific fuel consumption and/or the range of revolutions and torque for better energy saving.

24 Claims, 6 Drawing Sheets

BATTERY CHARGING COACTION AND OUTPUT SYSTEM WITH CURRENT LIMIT SUPPLY

BACKGROUND OF THE INVENTION (a) Field of the Invention

The battery charging coaction and output system with current limit supply relates to a power system utilizing an engine generator or public power with AC source, wherein the power system particularly has the characteristics that the maximum output current thereof is limited by electromagnetic effects, and/or constant current or nearly constant current output thereof is set to be lower than the maximum output current, for powering a load, and timely supporting charging a setting type or vehicle type battery, or jointly powering a load with a battery; when an engine generator set is utilized to be power supply, during operation, the engine operates with the best brake specific fuel consumption and/or the range of revolutions and torque for better energy saving.

(b) Description of the Prior Art

Battery, developed to date, by reason of its convenience for carriage from one place to another and volumetric density, up to utility level, is nowadays frequently used for purpose of emergency power storage, or as a means of power supply to motor driven implements, power driven tooling or more generally as a DC power supply; the pity, however, is that where power supply is required for a prolonged term, or where efforts to enlarge dimensionally a battery would inevitably involve cost increases or weight increases, or still, where exposed to working at a more profound discharge depth the battery would suffer from a shortened service term, improvement to resolve the problems as such is provided in the U.S. Pat. No. 6,831,464 by the inventor, disclosing an engine-driven storage battery auxiliary charging system with automatic monitoring operation functions to adopt engine generator as auxiliary power supply for driving a load motor (or other loads) and timely supporting charging a setting type or vehicle type battery, so as to keep good reserve power status; however, the inventor has found through more subsequent R&D efforts that further improvements as regards the performance feature of the system are made possible to make the entire system more comprehensive and irreproachable.

SUMMARY OF THE INVENTION

The present invention relates to a power system utilizing an engine generator or public power with AC source, wherein the power system particularly has the characteristics that the maximum output current thereof is limited by electromagnetic effects, and/or constant current or nearly constant current output thereof is set to be lower than the maximum output current, for powering a load, and charging a battery, or jointly powering a load with a battery; when an engine generator set is utilized to be power supply, during operation, the engine operates with the best brake specific fuel consumption and/or the range of revolutions and torque for better energy saving.

DESCRIPTION OF MAIN COMPONENT SYMBOLS (BAT101): Battery
(BCD101): Battery storage status detector
(BR101), (BR201): Rectifier
(B+): Auxiliary power supply
(CCU101): Central control unit
(CCT100): Magnetic flux leakage transformer
(CD100), (CD101): Drive control
(CR101), (CR201): Blocking diode
(FEC101): Magnetic field excited controller
(FC101): Fuel supply servo-mechanism
(G101): Generator
(ICE101): Engine set
(ID100), (ID200): Current detector
(M100): Starter motor
(M101): Load motor
(MI101): Manual control device
(PS100): Auxiliary power supply
(RG101): Regulator
(SPD101): Engine speed detector
(SSW101): Controllable two-way switch
(SSW102): Switch featuring a controllable point C
(TK101): Fuel tank
(VB+): Charging power supply
(VM+): Power side
(Z101): Impedance element

DETAILED DESCRIPTION OF THE PREFERRED EMBODIMENTS

The battery charging coaction and output system with current limit supply relates to a power system utilizing an engine generator or public power with AC source, wherein the power system particularly has the characteristics that the maximum output current thereof is limited by electromagnetic effects, and/or constant current or nearly constant current output thereof is set to be lower than the maximum output current, for powering a load, and timely supporting charging a setting type or vehicle type battery, or jointly powering a load with a battery; when an engine generator set is utilized to be power supply, during operation, the engine operates with the best brake specific fuel consumption and/or the range of revolutions and torque for better energy saving.

Figure 1:
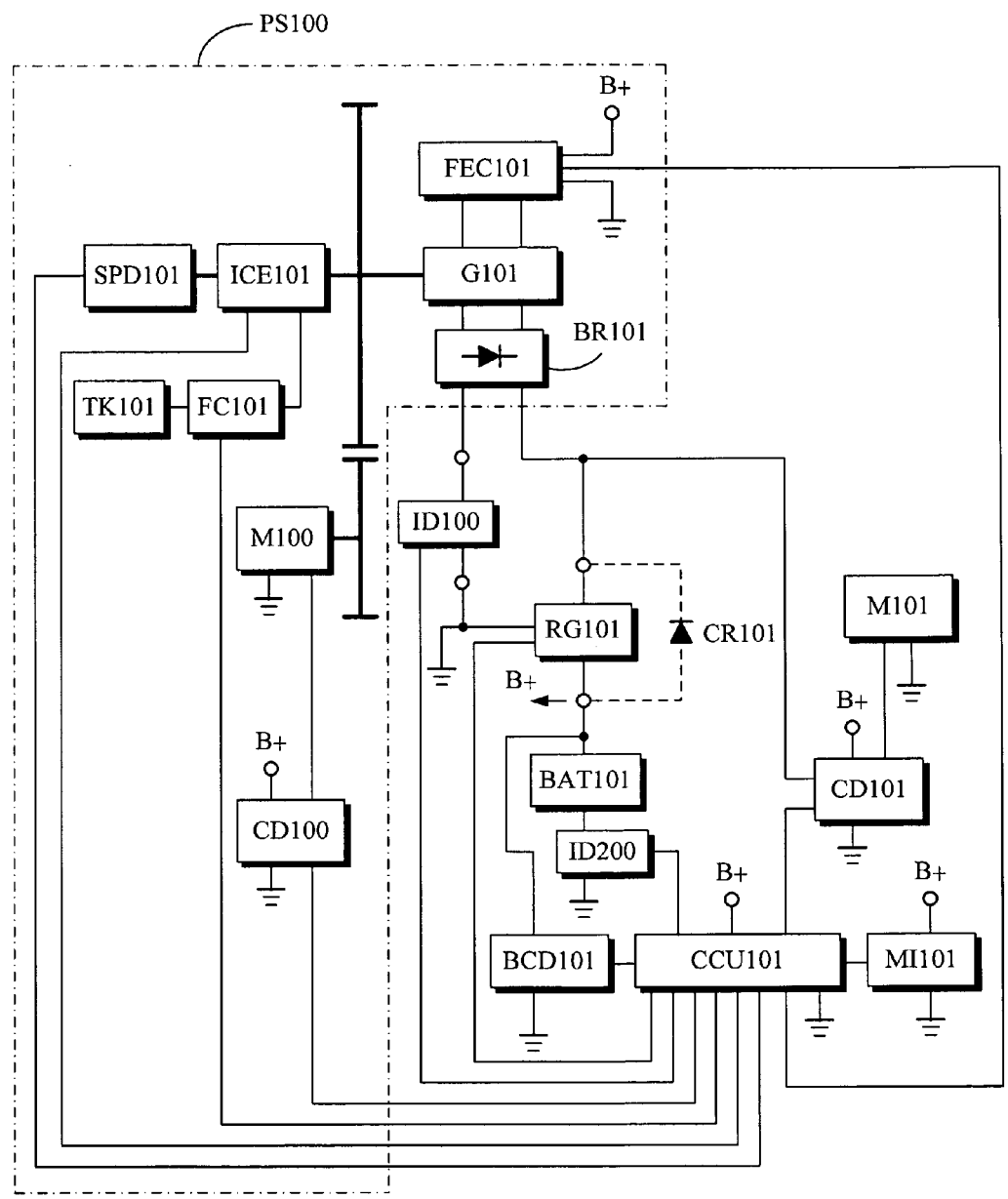
FIG. 1 is a system block diagram of the present invention.

FIG. 1 is a system block diagram of the battery charging coaction and output system with current limit supply, and the main components are explained as following:

Battery (BAT101): related to a secondary battery, which is capable of repeated charging/discharging recycling operation, for example, a battery of the plumbic acid, nickel/cadmium, nickel/nitrogen, or nickel/zinc structure or else of the lithium system, or still of the zinc system battery or otherwise secondary battery, such a battery being irremovably installed to the circuit or alternatively instead installed complete with plug or socket assembly or with coupling allowing for rapid assemblage or removal;

Battery storage status detector (BCD101): related to a measurement circuit device, which is provided to conduct continuous or periodical testing or else to convert to digital or analogue power signal output for using the measured values such as terminal voltage, or internal impedance, or volume or specific weight of the battery (BAT101) as parameters, as well as errors of loading conditions related to charging or discharging, or static loading for correction purposes; and consists of analogy measurement circuits incorporating electromechanical or solid state electronic elements, or alternatively digital measurement circuits incorporating microprocessor, associated software and interface electronic accessories, or a mixture composition; this detector assembly being an optional device as needed;

Current detector (ID100): related to a current sampling means connected in series to the output terminal of a generator (G101) or an auxiliary power supply (PS100) which takes the form of a DC charging converted from an AC line voltage, which is constituted by resistive or conductive impedance elements or a combination of both, or a semiconductor voltage drop element, or by a magnetic field strength sensor, or other means of heat cumulation or electromagnetic effect type capable of yielding current testing values to be converted into analogue signals with which to detect an output current for the generator (G101) (or input current for specific conditions), by which to control a regulator (RG101), or else to be fed to a central control unit (CCU101), so as to control in turn the operation condition of the generator (G101), which is also an optional feature dependent on system considerations;

Current detector (ID200): related to a current sampling means connected in series to the input/output terminals of the battery (BAT101), which is constituted by resistive or conductive impedance elements or a combination of both, or a semiconductor voltage drop element, or by a magnetic field strength sensor, or other means of heat accumulation or electromagnetic effect type capable of yielding current testing values to be converted into analogue signals with which to detect an input or output current for the battery set, and to pass to a drive control (CD101) or the central control unit (CCU101), this in turn to control the output power rate of the battery (BAT101); this detector being an optional feature dependent upon system requirements;

Auxiliary power supply (PS101): related to a system including a revolving or reciprocating internal combustion engine set (ICE101) with output of kinetic mechanic energy by the combustion of gasoline, diesel oil, or gas or other form of fluid fuel, and the driven generator (G101) constituted by the structure of AC, DC, brushless or brushed armature assembly, for serving to convert the incoming engine revolving kinetic energy into DC power, or alternatively to convert AC power through rectification at a rectifier (BR101) into DC power; or alternatively the auxiliary power supply (PS101) is executed in a means to convert AC line voltage potential into DC charging power, for serving eventually to drive a load motor (M101) or other loads, and to charge batteries;

Rectifier (BR101): related to a device to convert by rectifying single phase or multiple phase AC power into DC power in dealing with AC generator, this being an optional feature dependent upon system requirements;

Magnetic field excited controller (FEC101): composed of mechanic or solid state elements, to control the power generating from an AC or DC generator comprising magnetic field excited windings, basing on the generator output status and a manual control device (MI101) and the central control unit (CCU101) settings, so as to achieve in regulatory control of voltage, current or power rate, this feature to be saved where the generator pole is of a permanent magnet type;

Engine speed detector (SPD101): related to a speed detector, which is analog or digital in execution, capable of converting angular displacements into correspondent electric signals in electromagnetic or photoelectric forms so as to feed engine speed signals to the central control unit (CCU101), and consequently regulate the fuel supply from a fuel supply servo-mechanism (FC101) to engine set, while signal value of this device can also be substituted by the analogous voltage or frequency value of the generator (G101); the engine speed detector (SPD101) can also be made to consist of mechanical structure, such as, centrifugal testing structure or otherwise mechanical structure, and made in mechanical interaction with the fuel supply servo-mechanism (FC101) so as to bring the engine set (ICE101) into fixed speed rotation; both executions disclosed hereinbefore are to be adopted depending on the nature of the system involved, and the device on top of that, is an optional feature contingent on system requirements;

Starter motor (M100): composed of an electric structure which is AC or DC, brushed or brushless, synchronous or asynchronous, to receive input electric energy so as to produce revolving kinetic energy to initiate the engine set (ICE101), this being an optional feature dependent on system requirements;

Fuel tank (TK101): related to a device where engine fuel is stored, to control fuel supplied to the engine set (ICE101) by means of fuel piping and the fuel supply servo-mechanism (FC101) interconnected therebetween, this being an optional feature contingent upon system requirements;

Fuel tank (TK101): related to a device where engine fuel is stored, to control fuel supplied to the engine set (ICE101) by means of fuel piping and the fuel supply servo-mechanism (FC101) interconnected therebetween, this being an optional feature contingent upon system requirements;

Drive control (CD100): related to a device comprising essentially mechanical or solid state power elements and associated circuits, to drive the starter motor (M100) into operation or else to stop its operation, this being an optional feature dependent upon system requirements, or contingent upon circuit configurations;

Drive control (CD101): composed of mechanical or solid state elements and relevant circuits, to control the load motor (M101) for forward/reverse rotation, speed regulation, startup and stop setting, in respect of which the quantity to be supplied per item is dependent upon system requirements, and this feature, on the whole, is optional upon system requirements too; or this being an optional feature contingent upon circuit configurations;

Load motor (M101): composed of AC or DC, brushed or brushless, synchronous or asynchronous motor, realizing forward rotation, reverse rotation, speed regulation, operation and stoppage and such like functions so as to drive a load, the load motor (M101) may also be in the form of another load or still, be replaced by another load, in respect of which the quantity of installation is dictated by system requirements;

Auxiliary power supply (B+): related to auxiliary power supply with power sourced to the battery (BAT101) in the system, or with an additionally provided battery set serving as the auxiliary power supply or as derived from generator generation, and that in an effort to offer power supply to the central control unit (CCU101), or the manual control device (MI101), or the drive control (CD101) of the load motor (M101), or the drive control (CD100) of the starter motor (M100), or the magnetic field excited control (FEC101), or the regulator (RG101), or still else such as lighting facilities for actuation; where an auxiliary battery set is provided, the generator may be additionally furnished with correspondent power windings basing on required voltage and current capacities to facilitate charging of the auxiliary battery, this feature being an option contingent on system requirements;

Central control unit (CCU101): composed of mechanical or solid state elements which form alternatively or digital structure or a combined structures of both executions; or still of micro-processor comprising operation and control software, D-A converter and A-D converter or other associated circuit elements, with control modes established internally basing on instructions given by the manual control device (MI101) or on feedback signals instead, so as to control and manipulate interactions between the system generator (G101), the auxiliary power supply PS101 in the form of DC charge converted from an AC line feeder, the battery (BAT101) and the load motor (M101) or otherwise load, and the operation of other relevant installations as well; this being an optional feature contingent upon system requirements;

Manual control device (MI101): composed singly of mechanic or solid state elements in analogy mode or digital mode as separate from or else in combination with each other, for feeding to the central control unit so as to control the overall system operation, in respect of which the quantity to be installed is dependent upon system requirements; and for that reason, this is an optional feature; and Regulator (RG101): composed of mechanic or solid state elements, to actively refer to the output voltage and current values of the auxiliary power supply (PS100) constituted by the DC charge electric energy transferred from the generator (G101) or public power with AC source, or to passively receive the instructions of the central control unit (CCU101), for feedback control over the output power of the auxiliary power supply (PS100) constituted by the DC charge electric energy transferred from the generator (G101) or public power with AC source; this being an optional feature contingent upon system requirements.

For the battery charging coaction and output system with current limit supply, the main operational features are as following:

for the output current of the auxiliary power supply (PS100), the rated maximum output current is limited by electromagnetic effects, and/or constant current or nearly constant current is set to be lower than the maximum output current, and the output terminal voltage is random variation; the operational conditions of the output current of the auxiliary power supply include that the auxiliary power supply (PS100) separately outputs the electric energy, or on the basis of setting the rated maximum output current of the auxiliary power supply, and/or outputting the constant current or nearly constant current set to be lower than the maximum output current, jointly drives a load with the battery (BAT101), and changes the charge input current and the discharge output current of the battery with the light and heavy loads; in which if the load current is smaller than the rated maximum output current of the auxiliary power supply (PS100), the auxiliary power supply (PS100) will the whole current for the load, including outputting the set maximum output current, and/or the constant current or nearly constant current set to be lower than the maximum output current, and charging or suspending charging the battery (BAT101), for the auxiliary power supply (PS100) operating in the workspace in which the engine operates with the best brake specific fuel consumption and/or better energy saving efficiency, and further adjusting the difference between the current of the auxiliary power supply (PS100) and the load current;

if the load current is bigger than the normal rated current, the auxiliary power supply outputs the rated maximum current, or the constant current or nearly constant current set to be lower than the maximum output current, and if the output current of the auxiliary power supply (PS100) is smaller than the load current, the current difference is discharged output by the battery (BAT101);

for the battery charging coaction and output system with current limit supply, the type of inputting electric energy includes that if the engine generator set is the auxiliary power supply (PS100), a generator is selected in which whose maximum output current thereof is limited by electromagnetic effects, and/or constant current or nearly constant current output thereof is set to be lower than the maximum output current, and when the load current increases, the generator with difference-excited feature subsequently reduces the excitation intensity to lower the output voltage to limit the maximum output current of the generator in the auxiliary power supply (PS100); the above generator is an AC or DC generator, or a generator which is controlled to output constant current or nearly constant current lower than the maximum output current; and/or if a generator driven by an engine is the auxiliary power supply (PS100), the operation torque of the engine and the output current of the driven generator are established the relative proportion parameter, by way of adjustments of the excitation magnetic field strength of the generator and the rotation speed of the engine, the output current of the driven generator is the set maximum output current, and/or constant current or nearly constant current set to be lower than the maximum output current, and specifically focusing on the brake specific fuel consumption of the engine, referring to the engine torque of the generator with the above output current, the rotation speed of the engine with the relative best and/or better energy saving efficiency in brake specific fuel consumption, and the excitation intensity from the electric machine characteristic of the generator itself or the generator driven by the magnetic field excited controller (FEC101), through the matching adjustments for the above factors to make the engine, during the operation of the auxiliary power supply (PS100), to operate with the best brake specific fuel consumption and/or the range of revolutions and torque for better energy saving; and/or if the AC source is adopted as the auxiliary power supply (PS100), a magnetic flux leakage transformer (CCT100) is used to limit the maximum output current, in which the amount of the cross-flux magnetic flux leakage increases with the increasing load current.

For the battery charging coaction and output system with current limit supply, which is designed essentially to maintain storage battery in an adequately charged condition by using an engine generator, or alternatively the auxiliary power supply (PS100) in the form of DC charge converted from an AC line feeder, as the auxiliary power supply (PS100), so as to drive a load motor (or other loads), and for timely supporting charging a setting type, vehicle type, or portable battery; in operation, testing measurement is made, basing on a manual control device, or else on a central control unit programmed for the purpose with battery storage condition taken into account, whereby circuit testing signal value is compared with aforementioned controlled or setting value, and that bringing about proportionate, controlled operation of the engine driven generation set or the auxiliary power supply (PS100) in the form of DC charge converted from an AC line feeder, incorporating optionally various functions including any or all of the following:

(1) When the system is not actuated to drive a load, and the battery saturation status has been confirmed to drop to a level below a prescribed threshold, the engine startup motor must be activated manually or electrically and that in turn will initiate engine and generator set to charge the battery alone, the charging may alternatively take place by an AC line system such that charging is suspended once saturation is reached in the battery;

(2) To drive a load, a comparison is made of the saturation status of the battery in reference to the operation model set in the central control unit, to follow that, the generator is regulated, or alternatively, the auxiliary power supply (PS100) in the form of DC charge converted from an AC line system, is operated to deliver output power of a constant current or controlled current, or alternatively, of a constant rated power, or of a controlled rated power, such that once the power required by the load exceeds the auxiliary power supply (PS100), power required by the load motor or otherwise load will be jointly met by those supplied from the auxiliary power supply and the battery; and where power required by the load is less than the auxiliary power supply (PS100), the latter may feed power to the load and feed surplus power to the battery at the same time, and once the load is augmented in this manner to a level exceeding the power rating of the auxiliary power supply (PS100), the system will shift automatically to operate in the model of function (3), while returning to rated power functioning where rated power on the load is inferior to the auxiliary power supply (PS100);

(3) To run a power output under fixed current or controlled current, fixed power or controlled power condition, from the generator or from the auxiliary power supply (PS100) in the form of DC charge converted from an AC line system, as controlled as a function of the level of saturation detected of the battery, that in order for the auxiliary power supply (PS100) and battery to jointly activate the load motor or otherwise load pursuant to proportionate apportionment respecting the auxiliary power supply (PS100) against the load power factor, or as regards current rapport, such that when the load is downgraded or the load power factor falls below the power factor of the auxiliary power supply (PS100), and the system will shift to operate according to function (2), in the negative case power available will remain functioning as usual for operation;

(4) The ability to verify load current status of the load motor when driven by the battery alone, such that once the power factor of the load motor or other loads rises to a level beyond the set value or beyond the set time, the auxiliary power supply (PS100) will effect a constant current or controlled current output, or instead effect a constant power factor or controlled power factor output, as a function of the control model having been set in the central control unit, in an effort to drive the load in coordination with the battery, so that the auxiliary power supply (PS100) may continue to deliver output of power to the load motor or another load once the power factor on the part of the load motor or of another load resumes a normal level;

(5) The ability to drive engine and generator duly in response to manipulation of manual control assembly, such an ability to drive extends to an auxiliary power supply (PS100) in the form of a DC charge converted from an AC line system, and the ability includes further independent driving of a load motor or other load by the output power from the same auxiliary power supply (PS100), and the same output power together with battery power to jointly drive a load in the event the load in the load motor is increased, and that output power from the auxiliary power supply (PS100) continuing to be delivered to the load when the battery stops outputting once the motor load resumes on a normal track;

(6) The ability to accept manipulation from the manual control unit so as to initiate engine and generator or an auxiliary power supply (PS100) in the form of DC charge converted from an AC line system for a fixed current or controlled current output, or instead for a constant power factor or controlled power factor output, whereby proportionate apportionment is executed respecting the load power factor vis-à-vis current charge to drive the load motor and to charge the battery, such that the mode of operation will automatically shift to function (7) once the load is increased to a level beyond the charging power supply power factor, but switch back to the present mode of operation in the negative case;

(7) The ability to accept manipulation from the manual control unit so as to initiate engine and generator or an auxiliary power supply (PS100) in the form of DC charge converted from an AC line system, for fixed current, controlled current mode, or else fixed power rating, or controlled power rating mode output, and that in appropriate apportionment vis-à-vis the battery basing on generation power factor or loading power factor or current differential between both, whereby the auxiliary power supply (PS100) together with the battery take charge of the driving of the load motor or otherwise loading, such that the system shifts automatically to function (6) once the load is alleviated such that the rated loading power drops below the rated power of the auxiliary power supply (PS100), but resumes operating under this function in the negative case;

(8) The ability to accept manipulation from manual control unit so as to initiate engine and generator or the auxiliary power supply (PS100) in the form of DC charge converted from an AC line feeder for independent charge with respect to the battery;

(9) The provision to stop charging once the battery has reached predetermined saturation level as detected in the course of charging operation described under functions (1) and (8) hereinbefore;

(10) The provision to stop charging with respect to the battery without affecting power output being delivered from the auxiliary power supply (PS100) to the motor or otherwise load through manipulation by means of either the manual control unit or of the central control unit once the battery reaches a predetermined level in the course of operation pursued under function (2) and (6) described hereinbefore;

(11) The provision to stop charging with respect to the auxiliary power supply (PS100) concurrent with power being output to the motor or otherwise load way from the battery by means of manual mode control or central control unit control once the battery has reached a predetermined saturation point as detected in the course of operation pursued under functions (2) and (6) described hereinbefore; and

(12) The provision for the engine generator assembly or the auxiliary power supply (PS100) in the form of DC charge converted from an AC line feeder to continue operation while the battery switches from a charging state into feeding, in a joint effort with the auxiliary power supply (PS100), electric energy to the motor or otherwise load, through manual control device control or central control unit control, once the battery has just reached a predetermined saturation level detected in the course of a charging operation described pursuant to functions (2) and (6) hereinbefore.

Figure 2:
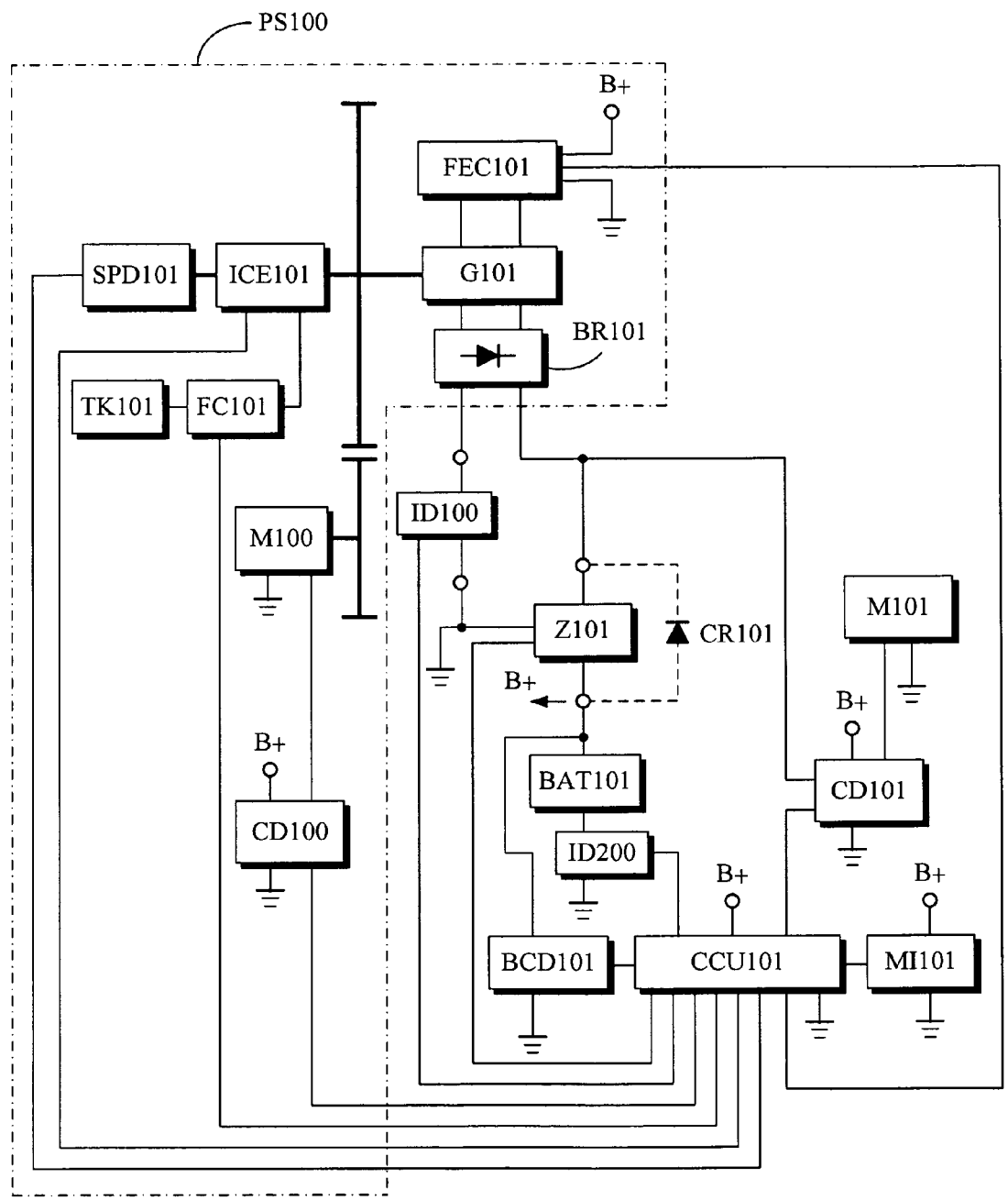
FIG. 2 is a block diagram shown a system with a blocking diode (CR101) and a blocking element (Z101) to control electric energies of the battery and generated output, according to the present invention.
Figure 3:
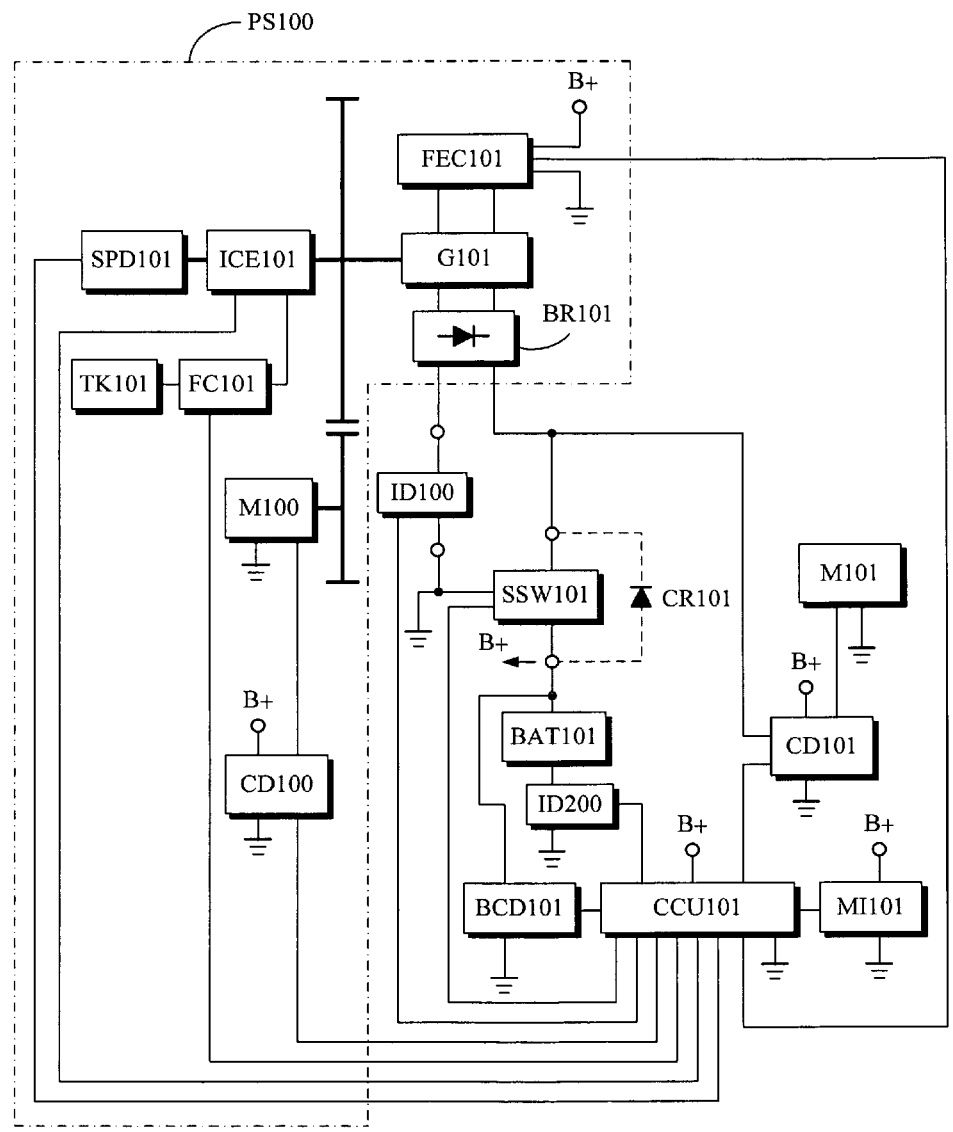
FIG. 3 is a block diagram shown a system with the blocking diode (CR101) and a controllable two-way switch (SSW101) to control electric energies of the battery and generated output, according to the present invention.
Figure 4:
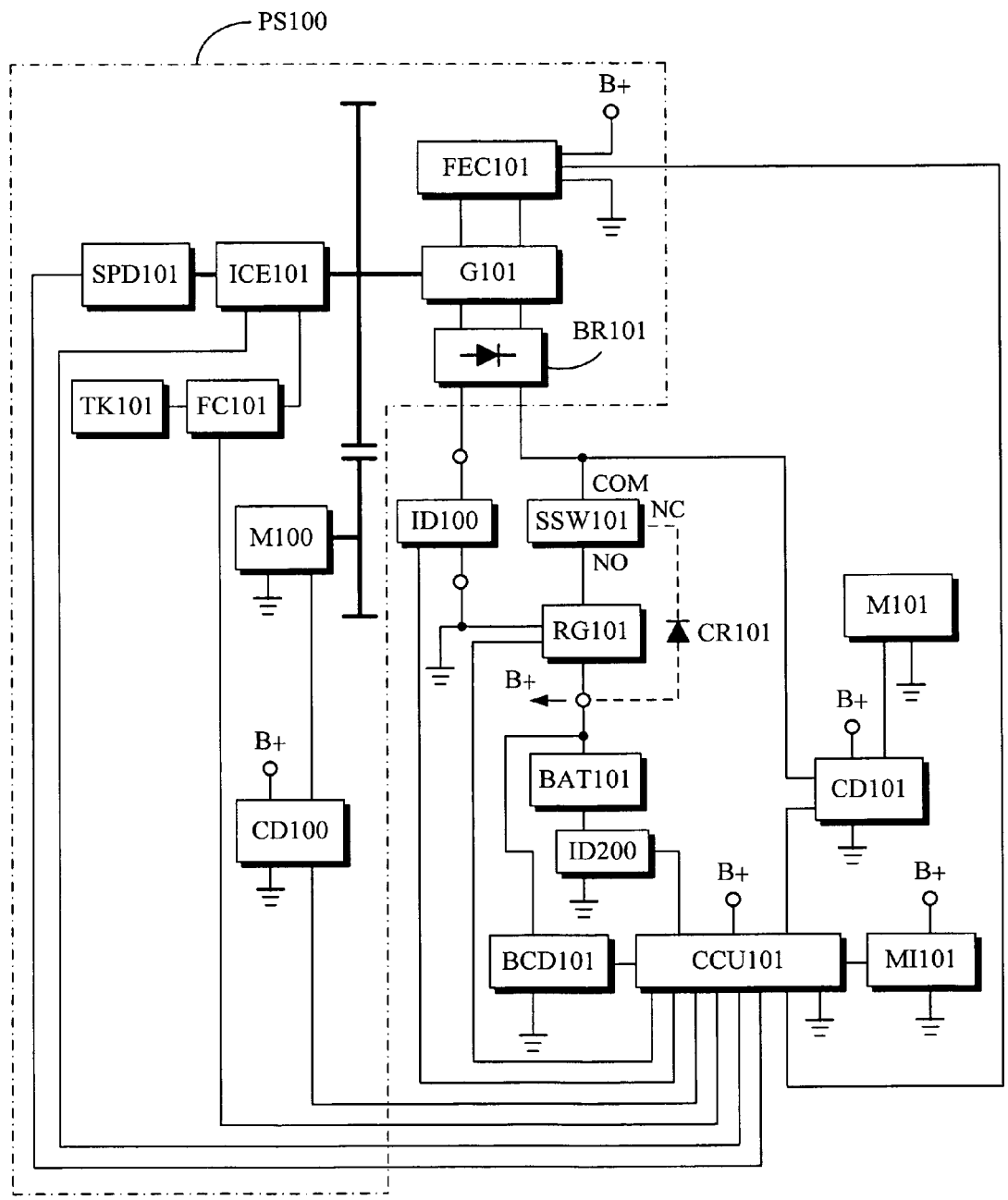
FIG. 4 is a block diagram shown a system with the blocking diode (CR101) and a regulator (RG101) to control a switch (SSW102) featuring a controllable point C for further controlling interactive operations between the battery electric energy and auxiliary power supply, according to the present invention.

When the battery charging coaction and output system with current limit supply is operating pursuant to functions (2) and (6), with power output of the generator (G101) or else released from the auxiliary power supply (PS100) in the form of DC charge converted from an AC line feeder set in parallel straight with the battery (BAT101), disparity in battery saturation status will have the effect such that the generator (G101) produces a surge charging with respect to the battery (BAT101) so long as the battery remains at a relatively lower capacity level, it is then time to operate by means of the following control circuits comprising:

the arrangement for a blocking diode (CR101) to be connected in forward series to the battery (BAT101), to thence form a parallel output with the DC output terminal straight of the generator (G101) or alternatively with that DC output terminal resultant from rectification of an AC source, or still with the auxiliary power supply (PS100) in the form of DC charge converted from an AC line feeder, while across both ends of the diode (CR101) is paralleled the regulator (RG101), so that the regulator (RG101) is made active to regulate power that is charged way from the generator or alternatively the auxiliary power supply (PS100) in the form of DC charge converted from an AC line feeder to the battery; the regulator (RG101) may be further adapted to be a receptor to control signals emitted from the central control unit (CCU101) basing on the testing result from the battery storage status detector (BCD101) so as to allow for regulation of charging rates or currents, and for control of startup or stopping of charging functions as well;

the arrangement for the blocking diode (CR101) to be connected in forward series to the battery (BAT101), to thence form a parallel output with the DC output terminal straight of the generator (G101) or alternatively with that DC output terminal resultant from rectification of an AC source, or still with the auxiliary power supply (PS100) in the form of DC charge converted from an AC line feeder, such as is exemplified in FIG. 1;

the arrangement for the blocking diode (CR101) to be serially forwardly connected to the battery (BAT101), to thence form a parallel output with the DC output terminal straight of the generator (G101) or alternatively with that DC output resultant from rectification of an AC source, or still with the auxiliary power supply (PS100) in the form of DC charge converted from an AC line feeder, across the blocking diode (CR101) may be paralleled (as shown in FIG. 2) an impedance element (Z101) which is essentially resistive or conductive or a combination of both, to replace the function of the regulator (RG101), to thereby restrict the current that is being released from the auxiliary power supply (PS100) into the battery;

the arrangement for the blocking diode (CR101) to be serially forwardly connected to the battery (BAT101), to thence form a parallel output with the DC output straight of the generator (G101) or alternatively with that DC output resultant from rectification of an AC source, or still with the auxiliary power supply (PS100) in the form of DC charge converted from and AC line feeder, across the blocking diode (CR101) may be paralleled an electromechanical or solid state controllable two-way switch (SSW101), such as is shown in FIG. 3, to allow for on/off control of the outputs of both the battery (BAT101) and the auxiliary power supply (PS100) and that in substitution of the function of the regulator (RG101), and that eventually serving to control the charging state on the part of the generator (G101) or the auxiliary power supply (PS100) in the form of DC charge converted from an AC line feeder with respect to the battery (BAT101) and next, the charging state of the battery (BAT101), interpreted as output, to the load motor (M101); and the arrangement for the blocking diode (CR101) together with the regulator (RG101) or the impedance element (Z101) bearing similar functions or the controllable two-way switch (SSW101) to be made in forward series with the output of the battery (BAT101), so that the DC power that is supplied by the generator (G101), or else by the auxiliary power supply (PS100) in the form of DC charge converted from an AC line feeder, the output of the diode (CR101) that is in forward series with the battery (BAT101), and the output of the regulator (RG101) or of the impedance element bearings similar functions (Z101) or still of the controllable two-way switch (SSW101), are of like polarity and this triplicate point is made in common with that a switch (SSW102) composed of electromechanical or solid state elements, as shown in FIG. 4, on which the point C is controllable, with one end of the auxiliary power supply (PS100) connected to the common point (COM) on the switch (SSW102) featuring a controllable point C, and with the output of the diode (CR101) and the input of the regulator (RG101) be electively, as per circuit requirements, connected to the normally open (NO) point or normally closed (NC) point on the switch (SSW102) featuring a controllable point C, what is achieved is the control, by means of the auxiliary power supply (PS100), of the charging state of the battery, on one hand, and, of the output state on the part of the battery, with respect to the load motor (M101) or otherwise loads, on the other hand.

The battery wherever mentioned hereinbefore, is executed where appropriate, either fixed as an installation in a circuit, or as a mobile, removable installation in a plug/socket assembly or otherwise combination form, associated with the primary circuit, featuring: (1) charging of the battery (BAT101) the AC to DC mode; (2) charging of the battery (BAT101) by DC converted from AC, and the same current as input of power to the load; (3) charging of the battery (BAT101) by DC converted from AC and the same current by way of the battery (BAT101) delivering power to the load; (4) the battery (BAT101) singly delivering power eventually to the load; and (5) the battery (BAT101) functioning as a filter, whereof that output terminal going to the load side is optionally equipped with a drive control (CD101) serving to control output voltage or output current or output polarity or serving to protect in the event of an overloading condition, by activating the associated control circuits.

Figure 5:
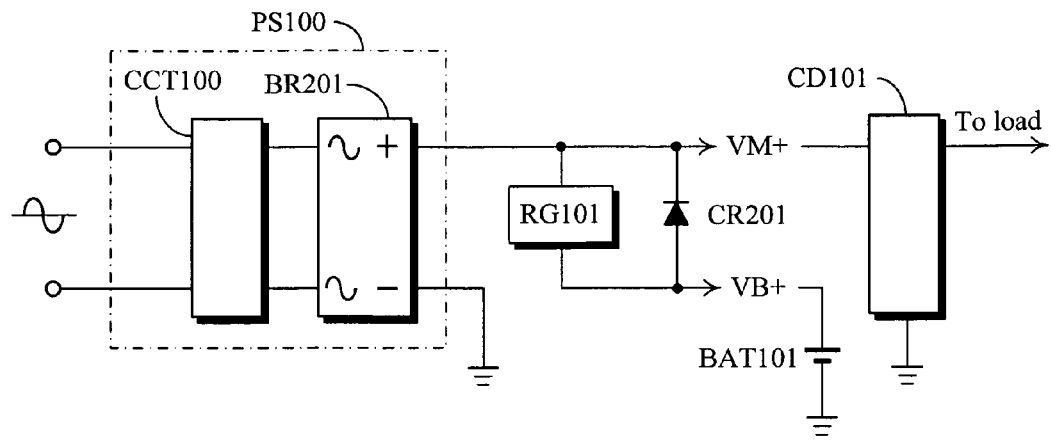
FIG. 5 is a schematic block diagram showing the circuit of an auxiliary power supply (PS100) which consists of the DC charge converted from an AC line voltage, according to the present invention.

FIG. 5 is a schematic block diagram showing the circuit of the auxiliary power supply (PS100) which consists of the DC charge converted from an AC line voltage, according to the present invention; it will be appreciated that the incoming AC power source, gone through the output terminal of the magnetic flux leakage transformer (CCT100), thence a rectifier (BR201), serves forthwith as the power supply (VM+) to the motor or otherwise load, on the one hand, a regulator serves as the charging power supply (VB+) to the battery (BAT101), on the other hand, both power supplies defined as such constitutes the auxiliary power supply (PS100), whereas the regulator (RG101) in series with the DC output of the auxiliary power supply, constituted of analogy or wave interceptor circuits, serving to restrict charging current to the battery (BAT101), of which the positive output terminal (VB+) is fed to the power side (VM+) of motor by way of a forward, serially connected diode (CR201), the battery mentioned in the foregoing is executed where appropriate, either fixed as an installation in a circuit, or as a mobile, removable installation in a plug/socket assembly or otherwise combination form, associated with the primary circuit, featuring: (1) charging of the battery (BAT101) the AC to DC mode; (2) charging of the battery (BAT101) by DC converted from AC, and the same current as input of power to the load; (3) charging of the battery (BAT101) by DC converted from AC and the same current by way of the battery (BAT101) delivering power to the load; (4) the battery (BAT101) singly delivering power eventually to the load; and (5) the battery (BAT101) functioning as a filter, whereof that output terminal going to the load side is optionally equipped with a drive control (CD101) serving to control output voltage or output current or output polarity or serving to protect in the event of an overloading condition, by activating the associated control circuits.

Figure 6:
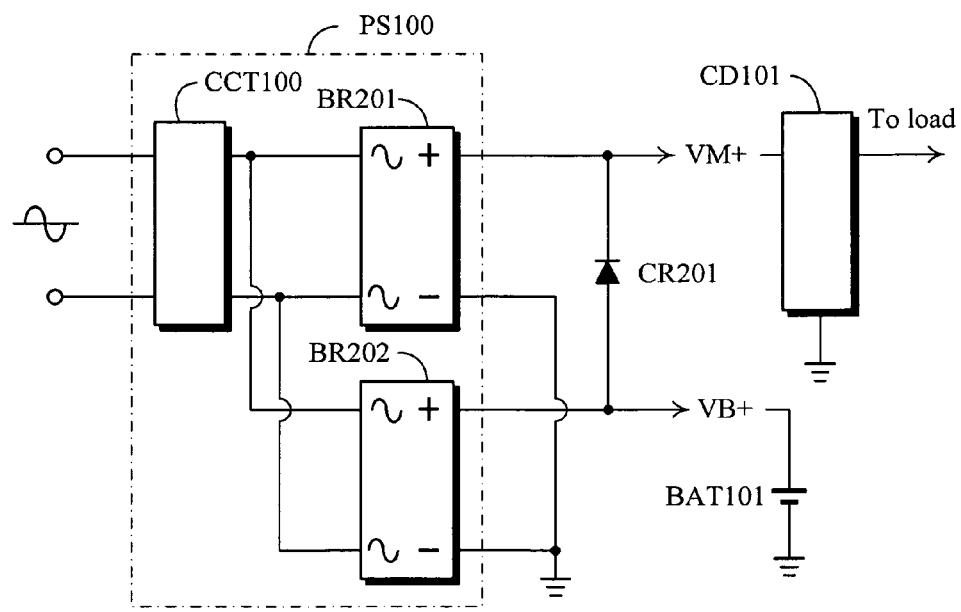
FIG. 6 is a schematic block diagram showing the circuit in which a magnetic flux leakage transformer (CCT100) and two sets of rectification circuits, which are equal voltages, are respectively serving as motor driven power supply or battery charging power supply, according to the present invention.

FIG. 6 is a schematic block diagram showing the circuit in which a magnetic flux leakage transformer (CCT100) and two sets of rectification circuits, which are equal voltages, are respectively serving as motor driven power supply or battery charging power supply, according to the present invention; in which it will be seen two sets of auxiliary power supply in the form of DC charge converted from AC source by way of rectifiers (BR201) and (BR202), with one set serving as the charging power supply (VM+) to the motor or other load, on the one hand, another set serving as the charging power supply (VB+) to the battery (BAT101); the magnetic flux leakage transformer (CCT100) is installed between the rectifier (BR201) and the incoming AC source, to restrict charging current to the motor or other loads; and the magnetic flux leakage transformer (CCT100) is installed between the rectifier (BR202) and the AC source, so as to restrict charging current to the battery (BAT101), whereof the positive output terminal (VB+) is given in forward series with a diode (CR201), leading to the power side (VM+) of the motor; the battery mentioned in the foregoing is executed where appropriate, either fixed as an installation in a circuit or as a mobile, removable installation in a plug/socket assembly or otherwise combination form, associated with the primary circuit, featuring: (1) charging of the battery (BAT101) the AC to DC mode; (2) charging of the battery (BAT101) by DC converted from AC and the same current by way of the battery (BAT101) delivering power to the load; (3) charging of the battery (BAT101) by DC converted from AC and the same current by way of the battery (BAT101) delivering power to the load; (4) the battery (BAT101) singly delivering power eventually to the load; and (5) the battery (BAT101) functioning as a filter, whereof that output terminal going to the load side is optionally equipped with a drive control (CD101) serving to control output voltage or output current or output polarity or serving to protect in the event of an overloading condition, by actuating the associated control circuits.

Figure 7:
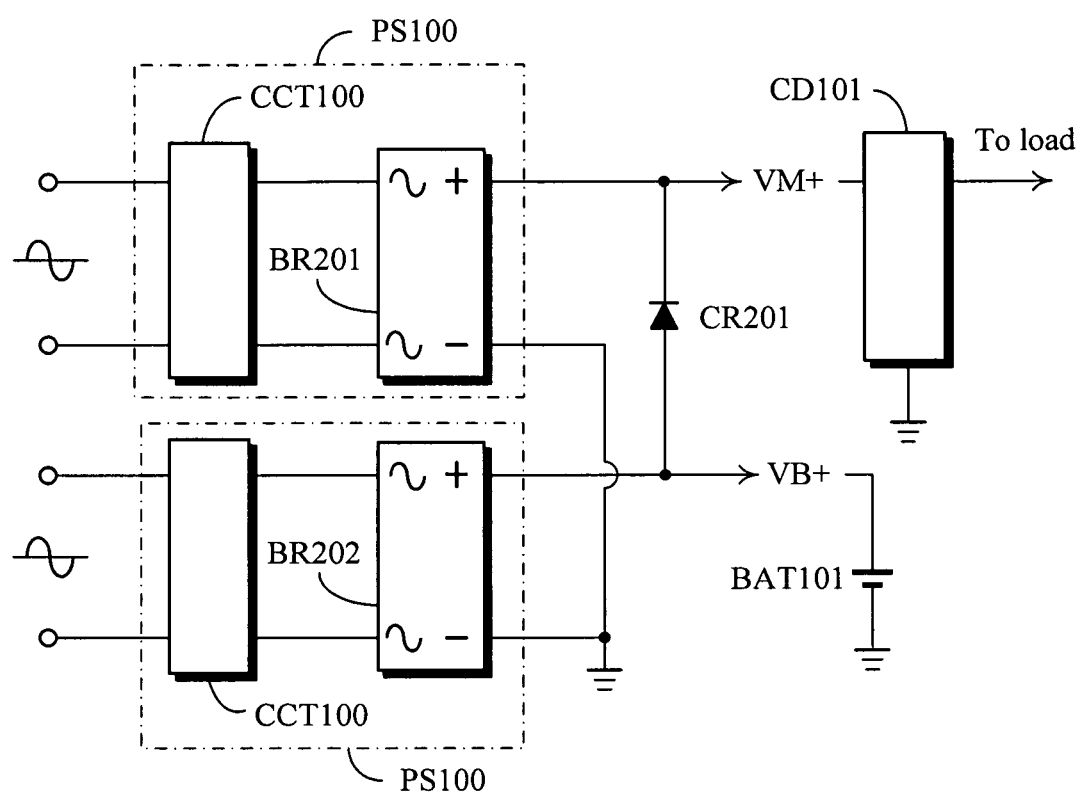
FIG. 7 is schematic block diagram showing the circuit in which different power supplies individually equipped with a rectifier set, and the individual magnetic flux leakage transformer (CCT100) are respectively serving as motor driven power supply or battery charging power supply, according to the present invention

FIG. 7 is schematic block diagram showing the circuit in which different power supplies individually equipped with a rectifier set, and the individual magnetic flux leakage transformer (CCT100) are respectively serving as motor driven power supply or battery charging power supply, according to the present invention; in which are represented circuit schematics for the supply of different AC voltage by way of two independent secondary winding or tap winding sets of the magnetic flux leakage transformer (CCT100), and two sets of rectifier circuits and exclusively independent regulators by which the motor driving power supply and the battery charging power supply are governed; as shown in the FIG. 7, there are two sets of auxiliary power supply in the form of DC charge converted from AC source by way of rectifiers (BR201) and BR202, with one set serving as the power supply to drive motor or otherwise load, designated (VM+), and the other set accounting for the power supply (VB+) to charge battery (BAT101); the magnetic flux leakage transformer (CCT100) is installed between the rectifier (BR201) and the incoming AC source, to restrict charging current to the motor or other loads, whereof the positive output terminal (VB+) is made in forward series with the diode (CR201), leading to the power side (VM+) of the motor; the AC source is of the single phase or multiple phase mode for input through the magnetic flux leakage transformer (CCT100), the battery mentioned in the foregoing is executed where appropriate, either fixed as an installation in a circuit or as a mobile, removable installation in a plug/socket assembly or otherwise combination form, associated with the primary circuit, featuring: (1) charging of the battery (BAT101) the AC to DC mode; (2) charging of the battery (BAT101) by DC converted from AC and the same current as input of power to the load; (3) charging of the battery (BAT101) by DC converted from AC and the same current by way of the battery (BAT101) delivering power to the load; (4) the battery (BAT101) singly delivering power eventually to the load; and (5) the battery (BAT101) functioning as a filter, whereof that output terminal going to the load side is optionally equipped with a drive control (CD101) serving to control output voltage or output current or output polarity or serving to protect in the event of an overloading condition, by actuating the associated control circuits.

By the battery charging coaction and output system with current limit supply described in the foregoing it is made possible to put the storage battery in a power storage condition that is better and more desirable than what is possible heretofore, serving not only to assist in the operation of a loading system, but also to avoid over-discharging the storage battery, thus achieving eventually the ultimate goal of prolonging service life of the battery assembly at large.

The invention claimed is:

1. A battery charging coaction and output system with current limited power supply, comprising: a battery (BAT 101) capable of repeated charging and discharging; and an auxiliary power supply (PS 100) connected to supply charging current to the battery (BAT101) and further connected to supply load current to the load, wherein said auxiliary power supply (PS 100) and battery (BAT 101) are thereby connected to selectively supply power to the load both individually and jointly, wherein an output current of the auxiliary power supply (PS 100) is limited, wherein a load current supplied to the load is a sum of the limited output current of the auxiliary power supply and a discharge output current of the battery, which varies dependent on the load such that: if the load current is smaller than a rated maximum output current of the auxiliary power supply (PS 100), the auxiliary power supply (PS 100) supplies all of the load current directly to the load, and further supplies a difference between the load current and the current limited output current to charge the battery (BAT100); if the load current is larger than a rated maximum output current of the auxiliary power supply (PS 100), the auxiliary power supply (PS 100) supplies all of the current limited output current to the load and a difference between the load current and the current limited output current is supplied to the load by the battery (BAT100), and wherein the auxiliary power supply (PS100) includes one of: (i) a generator (G101) driven by an engine (ICE101) and (ii) at least one rectifier for converting an AC line current into a DC auxiliary power supply output, and wherein the system is controlled as a function of battery saturation according to the following modes:

(a) when the system is not actuated to drive a load and the battery saturation status drops to a level below a prescribed threshold, an engine startup motor (M100) is activated to cause the engine (ICE t 01) to drive the generator (G 101) to charge the battery or the battery is charged by the DC converted AC line current, said charging by the generator (G101) or DC converted AC line current being suspended when the battery reaches saturation;

(b) to drive a load, a saturation status of the battery is compared by a central control unit (CCU101) to that of an operation model and the generator (G101) is controlled or the DC converted AC line current is regulated to deliver an output having a constant or controlled current or power such that once the power required by the load exceeds that supplied by the auxiliary power supply (PS100), power to the load is supplied jointly by the auxiliary power supply (PS100) and the battery (BAT101), and when the power required by the load is less than that supplied by the auxiliary power supply (PS100), the auxiliary power supply (PS 100) supplies power to the load and charging current to the battery until the power requirements of the load exceed a power rating of the auxiliary power supply (PS100), which case the system shifts to mode (c), as follows:

(c) when the power requirements of the load exceed a power rating of the auxiliary power supply (PS100), the battery (BAT101) and the auxiliary power supply (PS100) jointly supply power to the load with a proportion of power supplied by the auxiliary power supply (PS 100) and battery (BAT101) depending on a saturation state of the battery (BAT101), wherein the system switches to mode (b) when the power requirements of the load drop below the power rating of the auxiliary power supply (PS 100);

(d) when the load is driven solely by the battery (BAT101) power supplied to the load is monitored and, when the power supplied to the load exceeds a set value or extends beyond a set time, the auxiliary power supply (PS 100) supplies a constant or controlled current output to jointly drive the load with the battery (BAT101) in accordance with said operation mode.

2. A battery charging coaction and output system with current limited power supply as claimed in claim 1, wherein the auxiliary power supply (PS100) includes an internal combustion engine (ICE101) and a generator (G101) driven by the internal combustion engine (ICE101), and the output current of the auxiliary power supply (P100) is limited by controlling a rotation speed or torque of the engine (ICE101) so as to optimize fuel consumption or energy efficiency of the engine (ICE101), the current output of the generator (G101) being controlled by the rotation speed or torque of the engine (ICE101) and an excitation intensity of magnetic field windings of the generator (G101), the excitation intensity of the field windings being determined by electrical characteristics of the generator of the a magnetic field excitation control (FEC101).

3. A battery charging coaction and output system with current limited power supply as claimed in claim 2, wherein the generator (G101) is a permanent magnet generator and the magnetic field excited controller (FEC101) controls the excitation intensity of the magnetic field windings of the generator (G101) based on a generator output status, a manual control device (MI101), and settings of a central control unit (CCU101) so as to achieve regulator control of voltage, current or power.

4. A battery charging coaction and output system with current limited power supply as claimed in claim 2, further comprising an engine speed detector (SPD101) for supplying engine speed signals to a central control unit (CCU101) and consequently control the rotation speed or torque of the engine (ICE101) by regulating a fuel supply from a fuel tank (TK101) to the engine (ICE101) by a fuel supply servo mechanism (FC101), said engine speed detector (SPD101) including one of a device for detecting angular displacement of the engine (ICE101) and a voltage or frequency of the generator (G101).

5. A battery charging coaction and output system with current limited power supply as claimed in claim 2, further comprising a starter motor (M100) and starter motor drive control (CD100) for initiating rotation of the engine (ICE101).

6. A battery charging coactions and output system with current limited power supply as claimed in claim 2, further comprising a rectifier (BR101) connected to an output of the generator (G101).

7. A battery charging coaction and output system with current limited power supply as claimed in claim 2, further comprising an auxiliary power supply terminal (B+) for supplying power from the battery (BAT101) or an additional battery set to the magnetic field excitation control (FEC101) and additional components including at least one of a central controller (CCU101), a starter motor (M100), a drive control (CD100) of the starter motor (M100), a load motor (M101) of the load, a drive control (CD101) of the load motor (M101), auxiliary lighting, and a regulator (RG101) connected between the auxiliary power supply (PS100) and the battery (BAT101).

8. A battery charging coaction and output system with current limited power supply as claimed in claim 1, wherein the auxiliary power supply (PS100) is connected to an AC power source and include a magnetic flux leakage transformer (CCT100) and at least one rectifier (BR201 and/or BR202), and wherein the magnetic flux leakage transformer (CCT100) limits the output current of the auxiliary power supply (PS100) by increasing an amount of cross-flux magnetic flux leakage increases with an increasing load current.

9. A battery charging coaction and output system with current limited power supply as claimed in claim 8, wherein said at least one rectifier is a rectifier (BR201) connected to the battery (BAT101) and a load drive control (CD101) through a voltage regulator (RG101).

10. A battery charging coaction and output system with current limited power supply as claimed in claim 8, wherein said at least one rectifier includes a rectifier (BR201) connected to a load drive control (CD101) and a rectifier (BR202) connected to the battery (BAT101).

11. A battery charging coaction and output system with current limited power supply as claimed in claim 1, wherein the output current is a generally constant output current that is set to be lower than a maximum output current of the auxiliary power supply (PS100) and a terminal voltage of the auxiliary power supply is variable.

12. A battery charging coaction and output system with current limited power supply as claimed in claim 1, further comprising a first current detector (ID100) connected in series between an output terminal of the auxiliary power supply (PS100) and a battery charge/discharge regulator (RG101) to detect an output current of the auxiliary power supply and supply a current detection signal to a central controller (CCU101) for controlling an output of the generator (G101).

13. A battery charging coaction and output system with current limited power supply as claimed in claim 1, wherein the auxiliary power supply (PS100) further includes a rectifier BR101 for converting an AC output of the generator (G101) to a DC output of the auxiliary power supply (PS100).

14. A battery charging coaction and output system with current limited power supply as claimed in claim 1, wherein the auxiliary power supply (PS100) further includes at least one rectifier (BR201 and/or BR202) for converting an AC line input into a DC output of the auxiliary power supply (PS100).

15. A battery charging coaction and output system with current limited power supply as claimed in claim 1, wherein said battery (BAT101) is one of a lead acid, nickel-cadmium, nickel-nitrogen, nickel-zinc, and lithium battery.

16. A battery charging coaction and output system with current limited power supply as claimed in claim 1, wherein said battery (BAT101) is fixedly installed in said battery charging coactions and output system or installed by a removable coupling or plug and socket assembly.

17. A battery charging coaction and output system with current limited power supply as claimed in claim 1, further comprising a battery storage status detector (BCD101) arranged to continuously or periodically test parameters of the battery (BAT101) by measuring one of a terminal voltage, internal impedance, volume or specific weight, and charging, discharging, or static load condition errors.

18. A battery charging coaction and output system with current limited power supply as claimed in claim 1, further comprising a second current detector (ID200) connected in series with output terminals of battery (BAT101) for detecting an input or output current of the battery (BAT101) and supply a current measurement signal to one of a central control unit (CCU101) and drive control (CD101) for controlling an output power rate of the battery (BAT101).

19. A battery charging coaction and output system with current limited power supply as claimed in claim 1, wherein the load is a load motor (M101).

20. A battery charging coaction and output system with current limited power supply as claimed in claim 1, wherein the load motor (M101) is driven by a drive control (CD101).

21. A battery charging coaction and output system with current limited power supply as claimed in claim 1, wherein a blocking diode (CR101) is forward series connected between the battery (BAT101) and the auxiliary power supply (PS100) to prevent a current surge when the battery (BAT101) is at a relatively low capacity relative to the output of the auxiliary power supply (PS100).

22. A battery charging coaction and output system with current limited power supply as claimed in claim 21, wherein said blocking diode (CR101) is connected in parallel with at least one of a regulator (RG101), impedance element (Z101), and controllable two-way switch (SSW101).

23. A battery charging coaction and output system with current limited power supply as claimed in claim 22, wherein the controllable two-way switch (SSW101) is connected in series between the regulator (RG101) and the auxiliary power supply (PS100), and a control terminal (C) of the controllable two-way switch (SSW101) is connected with an output of the blocking diode (CR101).

24. A battery charging coaction and output system with current limited power supply as claimed in claim 1, wherein the system is controlled as a function of battery saturation according to at least one of the following additional modes:

(e) the load is independently controlled by a manual input and power is supplied to the load by the auxiliary power supply (PS 100) when the load power requirement is below a set level, and from the battery (BAT 101) jointly with the auxiliary power supply (PS 100) when the load power requirement is above the set level;

(f) the output of the auxiliary power supply (PSI00) is manually controlled by manually controlling the engine (ICE101) and generator (G101) or by controlling AC line input to DC conversion, such that when the output of the auxiliary power supply (PS100) is greater than power required by the load, the auxiliary power supplies power to the load and charging current to the battery until the power requirements of the load exceed a power rating of the auxiliary power supply (PS100), which case the system shifts to mode (g), as follows:

(g) when the power requirements of the load exceed a power rating of the auxiliary power supply (PS100), the battery (BAT101) and the auxiliary power supply (PS100) jointly supply power to the load with apportionment based on load or generator power requirements or current differential between the auxiliary power supply (PS100) and the load, wherein the system switches to mode (b) when the power requirements of the load drop below the power rating of the auxiliary power supply (PS 100);

(h) a manual control unit (MI101) initiates driving of the generator (G101) by the engine (ICE 101) or AC line conversion to independently charge the battery (BAT101);

(i) charging of the battery (BAT101) is terminated when the battery (BAT101) reaches a predetermined saturation level during any of said operations (a)-(g);

(j) termination of charging of the battery (BAT101) is carried out without affecting power output by the auxiliary power supply (PS 100) during said operations (b)-(e);

(k) upon termination of charging of the battery (BAT 101), power output from the battery (BAT101) to the load is initiated during operations (b)-(e); and (l) the auxiliary power supply (PS 100) continues to power to the load while the battery (BAT101) switches from a charging operation to a power output operation during operations (b)-(e).

\* \* \* \* \*